Nov. 21, 1944.   R. W. GOODWIN   2,363,411
QUICK ACTING OR SPEED CHUCK
Filed Sept. 4, 1943   2 Sheets-Sheet 1
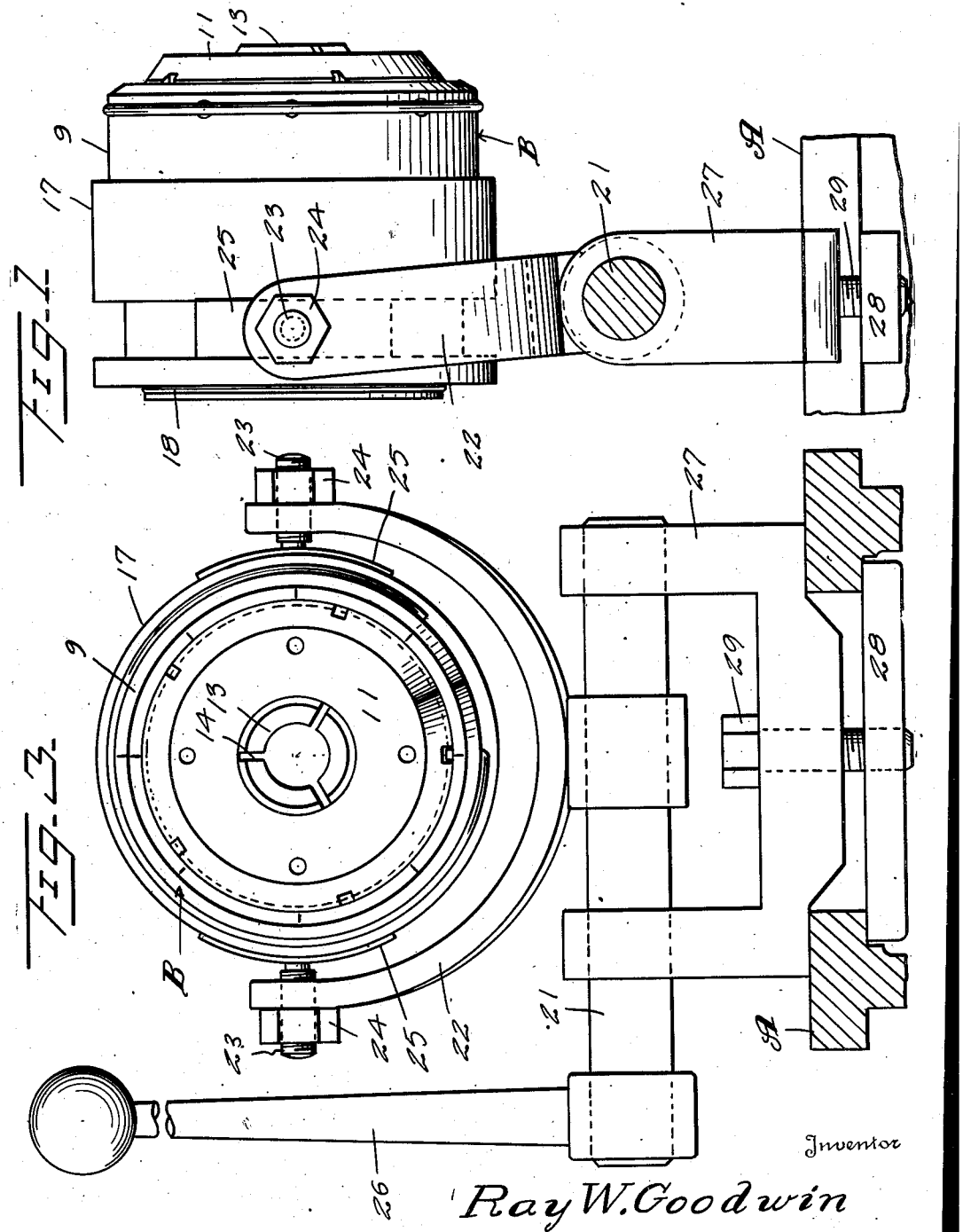
Inventor
Ray W. Goodwin
By [signature]
Attorney

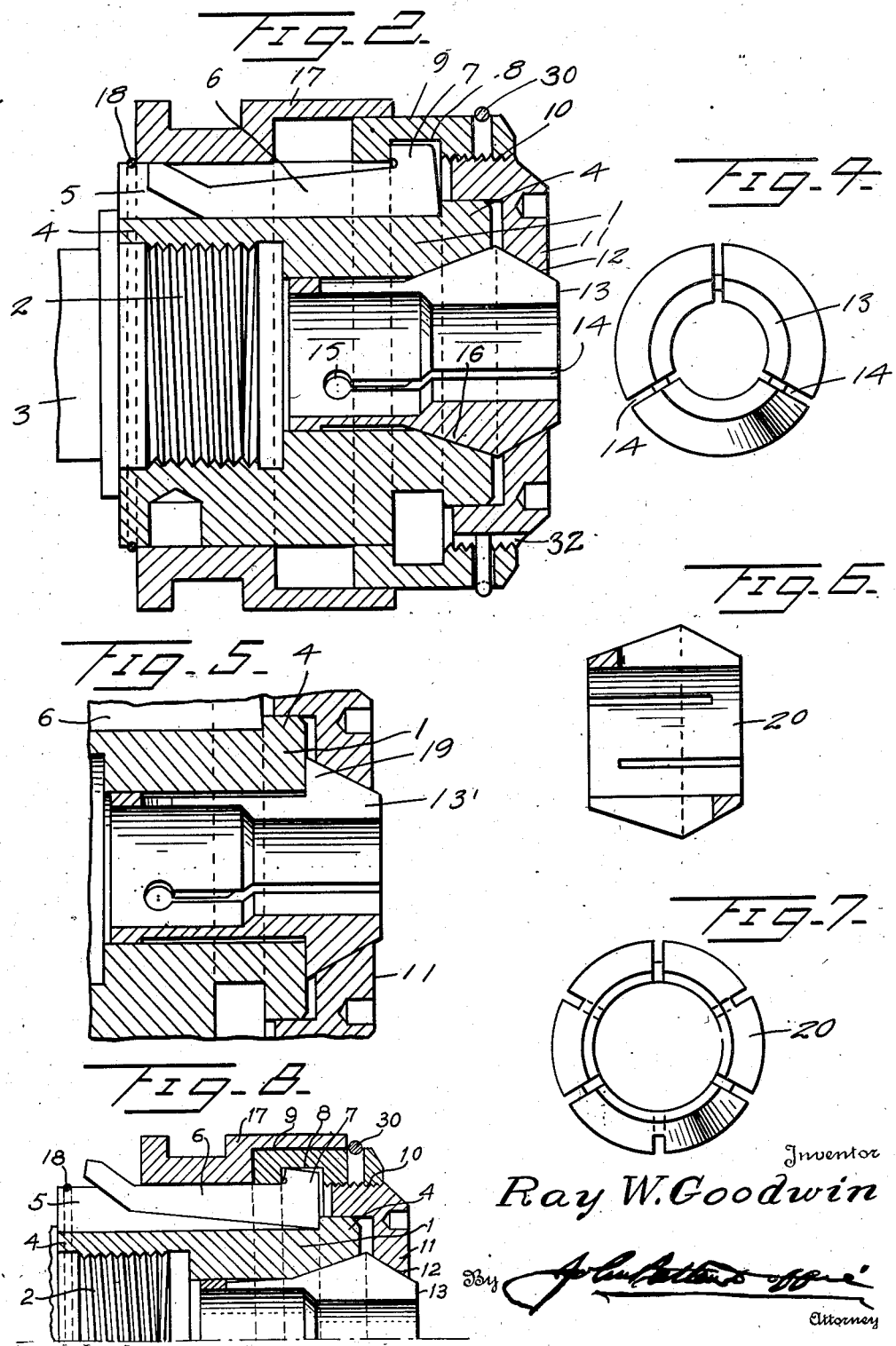

Patented Nov. 21, 1944

2,363,411

UNITED STATES PATENT OFFICE 2,363,411

QUICK-ACTING OR SPEED CHUCK

Ray W. Goodwin, Cuyahoga Falls, Ohio

Application September 4, 1943, Serial No. 501,301

5 Claims. (Cl. 279—51)

This invention relates to new and useful improvements in what may be termed a quick acting or speed chuck, and while primarily designed for latches, the same may also be used on milling and drilling machines and all kinds of machine work, where the parts or tools are held while machining operations are being performed, by fastening or attaching to said machine.

The primary object of my invention is to provide a quick acting or speed chuck of the character specified, employing a spindle nose collet, which is an improvement over the conventional type now used, by utilizing the full size of the hole through the spindle, eliminating the draw bar or pusher tube which other types of collets now use. This feature enables a lathe to use larger size bars of stock through the spindle.

My design of speed chuck is unique in that the entire mechanism is placed on the nose end of the spindle, instead of on the tail end, making it quickly removable or interchangeable with chucks for other types of work, should occasion require.

With the foregoing and other objects in view that will appear as the nature of my invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 1 is a side elevation of a quick acting collet chuck, embodying my improvements, and carried by a lathe or similar machine.

Figure 2 is an enlarged central longitudinal section of my quick acting chuck per se.

Figure 3 is a front view of the chuck and associated parts.

Figure 4 is a front view of the collet.

Figure 5 is a view similar to Figure 2, showing a slightly modified form of my invention.

Figure 6 is a sectional view, showing another modified form of my invention and Figure 7 is a front view of Figure 6.

Fig. 8 is a sectional view similar to Fig. 2, but showing the chuck in released or open position.

Referring to the drawings for a more particular description of my invention, and in which drawings like parts are designated by like reference characters throughout the several views, A designates a lathe or similar machine and B my quick acting collet chuck, as a whole.

Specifically, my improved quick acting chuck comprises the central tubular body member 1, provided at its inner end with an internal thread 2, for screw threaded engagement with the nose 3 of the lathe spindle 3'. The outer end of the tubular body member is provided with an annular shoulder 4, and the outer surface of the former with a series of three or more longitudinal grooves 5, in which are arranged the rocking keys or fingers 6. The fingers 6 are provided at their outer ends with the shoulders 7, which extend into an annular recess 8, formed in the collar 9. The outer portion of the collar 9 is provided with an internal thread 10, for screw threaded engagement with the cap 11.

In carrying out my invention, the cap 11 is formed with a central tapered opening 12, which bears against the correspondingly tapered nose of the spring collet 13. The collet 13 is of tubular design and provided with three or more longitudinal slits 14 terminating in circular holes 15, and also with the tapered portion 16, which bears against the correspondingly tapered surface of the tubular body member 1.

An outer sleeve or collar 17 is made to slide on the body member 1 and collar 9, and its inward movement is limited by the lock ring 18, which fits in a groove formed in said body member.

When the parts are in the position shown in Figure 2 of the drawings, the parts are in stock holding or locked position. However, when the collar 17 is moved outwardly, as shown in Fig. 8, the inner ends of the fingers 6 are permitted to swing about their points of contact with the shoulder 4 of the body member 1, allowing the collar 9 and cap 11 to move outwardly, thereby permitting the collet to expand and release the stock.

To contract the collet, the collar 17 is moved to the left which rocks the long arms of the levers or fingers 6 about their fulcrums and the shoulders 7 move the collar 9 and cap 11 to the left. This causes the collet to be squeezed between the tapered surfaces 12 and 16 to grip the work or tool. The threaded connection between the cap 11 and the collar 9 permits the collar to be adjusted to vary the effective internal diameter of the collet. To hold the members 9 and 11 in adjusted position, a spring ring 30 is located in a groove in the collar and provided with an inwardly turned end to engage one of several slots 32 located on the periphery of the cap as shown in Figs. 2 and 3. By this means the chuck may be quickly adjusted to fit varying sizes of stock or tools.

In the modified form of my invention illustrated in Figure 5 of the drawings, the collet 13' is provided with a straight shoulder 19, in lieu of the tapered surface 16, which prevents the collet from moving inwardly into the body member 1, when the collet is compressed into stock holding or locking position, thus enabling the chuck to hold the stock firmly in place without the slightest relative longitudinal movement. This feature is highly important in certain types of work.

In the modified form of my invention illustrated in Figures 6 and 7, the neck of the collet 20 is eliminated, thereby allowing the use of stock the full size of the bore in the tubular body member 1. The design of collet shown in Figures 6 and 7, is interchangeable with the collet shown in Figure 2, while the design of collet shown in Figure 5 is not readily interchangeable.

The collar 17 is connected with the rock shaft 21 by the yoke 22 and the diametrically opposed screws 23, held in adjusted position by the lock nuts 24. The inner ends of the screws 23 are provided with the arcuate shoes 25, which ride in the groove in the outer collar 17. One end of the rock shaft 21 is provided with a hand lever 26, the purpose of which will be apparent. The mounting bracket 27, lower plate 28 and screw 29 serve as a medium for attaching the chuck to a lathe or other machine or tool.

From the foregoing description taken in connection with the drawings, it is thought that the construction, operation and advantages of my invention will be readily understood, without requiring a more extended explanation.

One advantage of the new design shown and described herein is that the chuck is short, compact and rigid, thereby holding the article therein without vibration. The chuck is also simple in design with a minimum number of parts which are relatively easy to make and assemble.

Various changes in the form, proportions and minor details of construction may be resorted to without departing from the principles or sacrificing any of the advantages of my invention, as defined in the appended claims.

Having described my invention, what I claim as new and desire to secure by Letters Patent is:

1. A quick acting chuck comprising a tubular body adapted to be mounted on the rotating member of a machine tool, a spring collet located in the tubular body, said collet having a tapered outer surface, a shiftable cap member surrounding the outer end of the collet and the body, said cap having a surface fitting the tapered surface of the collet, a collar connected to said cap and surrounding the outer end of the body member, opposing shoulders on the body and the collar, the body being provided with longitudinal grooves, rocking keys located in said grooves, each key having portions bearing against said shoulders and a tail portion which projects beyond the outer surface of the body when the collet is expanded, and a sleeve movable over the body to engage the tail portions of the several keys.

2. A quick acting chuck comprising a tubular body adapted to be mounted on the rotating member of a machine tool, a spring collet located in the tubular body, said collet having oppositely tapered outer surfaces, a shiftable cap member surrounding the outer end of the collet and having a tapered surface fitting one tapered surface of the collet, the body having a tapered surface fitting the other tapered surface on the collet, and means to shift the cap axially along the body to expand or contract the collet comprising a plurality of keys located in grooves on the body, one extremity of each key bearing against a shoulder on the body to form a fulcrum, each key having a projection bearing against a shoulder carried by the cap, a tail portion on each key, and a shiftable sleeve surrounding the body, said sleeve engaging the tail portions of the keys and operable to rock them about their fulcrums.

3. A quick acting chuck comprising a tubular body adapted to be mounted on the rotating member of a machine tool, a spring collet located in the body, said collet having a tapered outer surface, a shiftable cap member surrounding the outer end of the collet and having a tapered surface fitting the tapered surface of the collet, and means to shift the cap axially on the body to contract the collet or permit it to expand comprising a plurality of keys located in grooves on the body, one extremity of each key bearing against a shoulder on the body to form a fulcrum, each key also having a portion bearing against a shoulder carried by the cap and having a tail portion, and a shiftable sleeve surrounding the body, said sleeve engaging the tail portions of the keys and operable to rock them about their fulcrums.

4. A quick acting chuck comprising a tubular body adapted to be mounted on the rotating member of a machine tool, a spring collet located in the tubular body, said collet having a tapered outer surface, a shiftable cap member surrounding the outer end of the collet and the body, said cap having a surface fitting the tapered surface of the collet, a collar connected to said cap and surrounding the outer end of the body member, said cap and collar being relatively adjustable, opposing shoulders on the body and the collar, the body being provided with longitudinal grooves, rocking keys located in said grooves, each key having portions bearing against said shoulders and a tail portion which projects beyond the outer surface of the body when the collet is expanded, and a sleeve movable over the body to engage the tail portions of the several keys.

5. A quick acting chuck comprising a tubular body adapted to be mounted on the rotating member of a machine tool, a spring collet located in the tubular body, said collet having oppositely tapered outer surfaces, a shiftable cap member surrounding the outer end of the collet and having a tapered surface fitting one tapered surface of the collet, the body having a tapered surface fitting the other tapered surface on the collet, and means to shift the cap axially along the body to expand or contract the collet comprising a plurality of keys located in grooves on the body, one extremity of each key bearing against a shoulder on the body to form a fulcrum, each key having a projection bearing against a shoulder carried by the cap, the location of the shoulder being adjustable axially of the chuck to vary the effective internal diameter of the collet, a tail portion on each key, and a shiftable sleeve surrounding the body, said sleeve engaging the tail portions of the keys and operable to rock them about their fulcrums.

RAY W. GOODWIN.

CERTIFICATE OF CORRECTION.

Patent No. 2,363,411.  November 21, 1944.

RAY W. GOODWIN.

It is hereby certified that error appears in the printed specification of the above numbered patent requiring correction as follows: Page 1, first column, line 4, for the word "latches" read --lathes--; and that the said Letters Patent should be read with this correction therein that the same may conform to the record of the case in the Patent Office.

Signed and sealed this 30th day of January, A. D. 1945.

Leslie Frazer (Seal)                      Acting Commissioner of Patents.